(12) United States Patent
Jhang et al.

(10) Patent No.: US 7,920,605 B2
(45) Date of Patent: Apr. 5, 2011

(54) ALL-FIBER COLOR LASER AND LIGHT-ILLUMINATING METHOD THEREOF

(75) Inventors: Yao-Wun Jhang, Chiayi (TW);
Chien-Ming Huang, Taipei (TW);
Hsin-Chia Su, Yunlin County (TW);
Shih-Ting Lin, Tainan (TW); Li-Ting Wang, Pingtung County (TW)

(73) Assignee: Industrial Technology Research Institute, Hsinchu (TW)

( * ) Notice: Subject to any disclaimer, the term of this patent is extended or adjusted under 35 U.S.C. 154(b) by 11 days.

(21) Appl. No.: 12/421,592

(22) Filed: Apr. 9, 2009

(65) Prior Publication Data
US 2010/0142564 A1 Jun. 10, 2010

(30) Foreign Application Priority Data
Dec. 4, 2008 (TW) .................. 97147089 A

(51) Int. Cl.
*H01S 3/30* (2006.01)
(52) U.S. Cl. ............................. 372/6; 372/23

(58) Field of Classification Search .............. 372/6
See application file for complete search history.

(56) References Cited

U.S. PATENT DOCUMENTS

| | | | |
|---|---|---|---|
| 6,594,288 B1 * | 7/2003 | Putnam et al. | 372/3 |
| 6,764,183 B2 | 7/2004 | Okazaki | |
| 7,136,401 B2 * | 11/2006 | Leplingard et al. | 372/6 |
| 7,277,618 B2 | 10/2007 | Yamazaki et al. | |
| 7,280,567 B2 * | 10/2007 | Luo et al. | 372/6 |

* cited by examiner

*Primary Examiner* — Minsun Harvey
*Assistant Examiner* — Xnning Niu

(57) ABSTRACT

An all-fiber color laser and a light-illuminating method thereof are disclosed. The steps of the light-illuminating method include: providing a fiber color laser having a pump light source and an optical fiber with a multi-level wavelength gain medium, a first grating assembly and a second grating assembly; radiating a laser via the pump light source; generating a plurality of laser beams with various wavelengths via the multi-level wavelength gain medium; adjusting the deformation of the second grating assembly to control output of the laser beams with various wavelengths; and executing periodical modulation to generate a periodical lengthwise deformation of the second grating assembly for mixing color.

23 Claims, 5 Drawing Sheets

ALL-FIBER COLOR LASER AND LIGHT-ILLUMINATING METHOD THEREOF

CROSS REFERENCE TO RELATED APPLICATIONS

This Application claims priority of Taiwan Patent Application No. 097147089, filed on Dec. 4, 2008, the entirety of which is incorporated by reference herein.

BACKGROUND OF THE INVENTION

1. Field of the Invention

The invention relates to an all-fiber color laser and a light-illuminating method thereof, and more particularly to an all-fiber color laser and a light-illuminating method thereof wherein a grating assembly of an optic fiber thereof is deformed.

2. Description of the Related Art

In recently, the quality of the light source is promoted. Due to high coherence and color saturation, the laser applied to the biological engineering measurement could provide high resolution, and the laser also provides a high-color display. Thus, in the application of the measurement and display, a laser is the best choice for a light source. However, for conventional lasers and light illuminating methods thereof, gain mediums only generate one light source with one wavelength. Thus, for measurement and display devices requiring varied laser wavelengths, a plurality of laser beams must be provided. Thus, costs for measurement and display devices with varied laser wavelengths are high and yields thereof are low. Additionally, because different colored lights have different light loss periods, chromatism occurs.

FIG. 1 is a schematic view of a conventional laser color display. Referring to FIG. 1, FIG. 1 is a drawing from U.S. Pat. No. 6,764,183 "COLOR LASER DISPLAY EMPLOYING EXCITATION SOLID LASER UNIT, FIBER LASER UNIT, OR SEMI CONDUCTOR LASER UNIT". A laser color display 10 uses a solid laser, an optic fiber laser and a semiconductor to generate red, green and blue laser lights. Various optical elements 11 generate three lights with different light ratios. The three lights are combined on the same optical axis to mix color. However, the laser color display 10 has many optical elements and a complex structure, thus, mixing of colors is difficult. In addition, the volume of the laser color display 10 is large. Additionally, because different colored lights have different light loss periods, chromatism occurs.

FIG. 2 is a schematic view of another conventional laser color display. Referring to FIG. 2, FIG. 2 is a drawing from U.S. Pat. No. 7,277,618 "WHITE LIGHT-EMITTING DEVICE USING FLUORESCENT FIBER". A laser illuminating device 20 includes a blue laser 21 and a fluorescent fiber 22. The blue laser 21 is utilized as a pump light source to stimulates a gain medium of the fluorescent fiber 22 to transform some blue lights into red or green lights. The transformed red lights, the transformed green lights and the surplus blue lights are mixed to generating white light. However, the transformed red lights and the transformed green lights are not laser beams, thus, coherence and the color saturation thereof decreases. In addition, the laser illuminating device 20 does not provide a color-choosing mechanism, thus, the red lights, the green lights and the blue lights must be generated simultaneously, resulting in low color mixing efficiency.

BRIEF SUMMARY OF THE INVENTION

The invention provides an all-fiber color laser. The all-fiber color laser includes a pump light source, an optic fiber and a plurality of modulators. The pump light source radiates a laser beam. The optic fiber connects to the pump light source, and includes a multi-level wavelength gain medium, a first grating assembly and a second grating assembly. The first grating assembly, the multi-level wavelength gain medium and the second grating assembly are adjacently disposed. The modulators connect to the second grating assembly. The laser stimulated via the gain medium generates a plurality of laser beams with various wavelengths, and the lengthwise deformation of the second grating assembly is adjusted via the modulators along the optic fiber to control the output of the laser beams with various wavelengths.

Note that the first grating assembly and the second grating assembly are fiber Bragg gratings (FBG) with various wavelengths.

Note that the multi-level wavelength gain medium is a praseodymium (Pr).

Note that the pump light source includes a laser diode, and the wavelength of a laser beam from the laser diode ranges from 780 to 880 nm to stimulate the praseodymium (Pr) of the multi-level wavelength gain medium.

Note that the laser beams with various wavelengths includes a first laser beam with a first wavelength $\lambda 1$, a second laser beam with a second wavelength $\lambda 2$, and a third laser beam with a third wavelength $\lambda 3$, and the threshold generating the first laser beam with the first wavelength $\lambda 1$ is greater than the threshold generating the second laser beam with the second wavelength $\lambda 2$, and the threshold generating the second laser beam with the second wavelength $\lambda 2$ is greater than the threshold generating the third laser beam with the third wavelength $\lambda 3$ (wavelength: $\lambda 1 < \lambda 2 < \lambda 3$).

Note that the laser beam with the first wavelength $\lambda 1$ ranges from 460 to 495 nm and is blue.

Note that the laser beam with the second wavelength $\lambda 2$ ranges from 515 to 550 nm and is green.

Note that the laser beam with the third wavelength $\lambda 3$ ranges from 600 to 717 nm and is red.

Note that the modulators includes a piezoelectric material or a circular magnetic field.

Note that the reflecting rate of the first grating assembly and the second grating assembly ranges from 80% to 99.9%.

Note that the first grating assembly includes a plurality of slits, the second grating assembly includes a plurality of slits, the modulators include a first modulator, a second modulator and a third modulator, and the interval of the slits of the second grating assembly is adjusted via the first modulator, the second modulator and the third modulator.

Note that the first grating assembly includes a first grating, a second grating and a third grating, the first grating, the second grating and the third grating are sequentially connected, the second grating assembly includes a fourth grating, a fifth grating and a sixth grating, modulators include a first modulator, a second modulator and a third modulator, and the fourth grating, the fifth grating and the sixth grating are sequentially connected to the first modulator, the second modulator and the third modulator.

An all-fiber color laser and a light-illuminating method thereof are disclosed. The steps of the light-illuminating method includes: providing a pump light source and an optical fiber connected to the pump light source, wherein the fiber optical fiber has a multi-level wavelength gain medium, a first grating assembly and a second grating assembly; radiating a laser via the pump light source; generating a plurality of laser beams with various wavelengths via the multi-level wavelength gain medium; adjusting the deformation of the second grating assembly to control output of the laser beams with various wavelengths; and executing periodical modulation to generate a periodical lengthwise deformation of the second grating assembly for mixing color.

Note that the steps further include outputting the laser beam with a first wavelength λ1 without the lengthwise deformation of the grating assemblies.

Note that the steps further include making a fourth grating and a fifth grating of the second grating assembly to lengthwise deform to output the laser beam with the third wavelength λ3.

Note that the steps further include making a sixth grating of the second grating assembly to lengthwise deform to output the laser beam with the second wavelength λ2.

The invention can be more fully understood by reading the subsequent detailed description and examples with references made to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
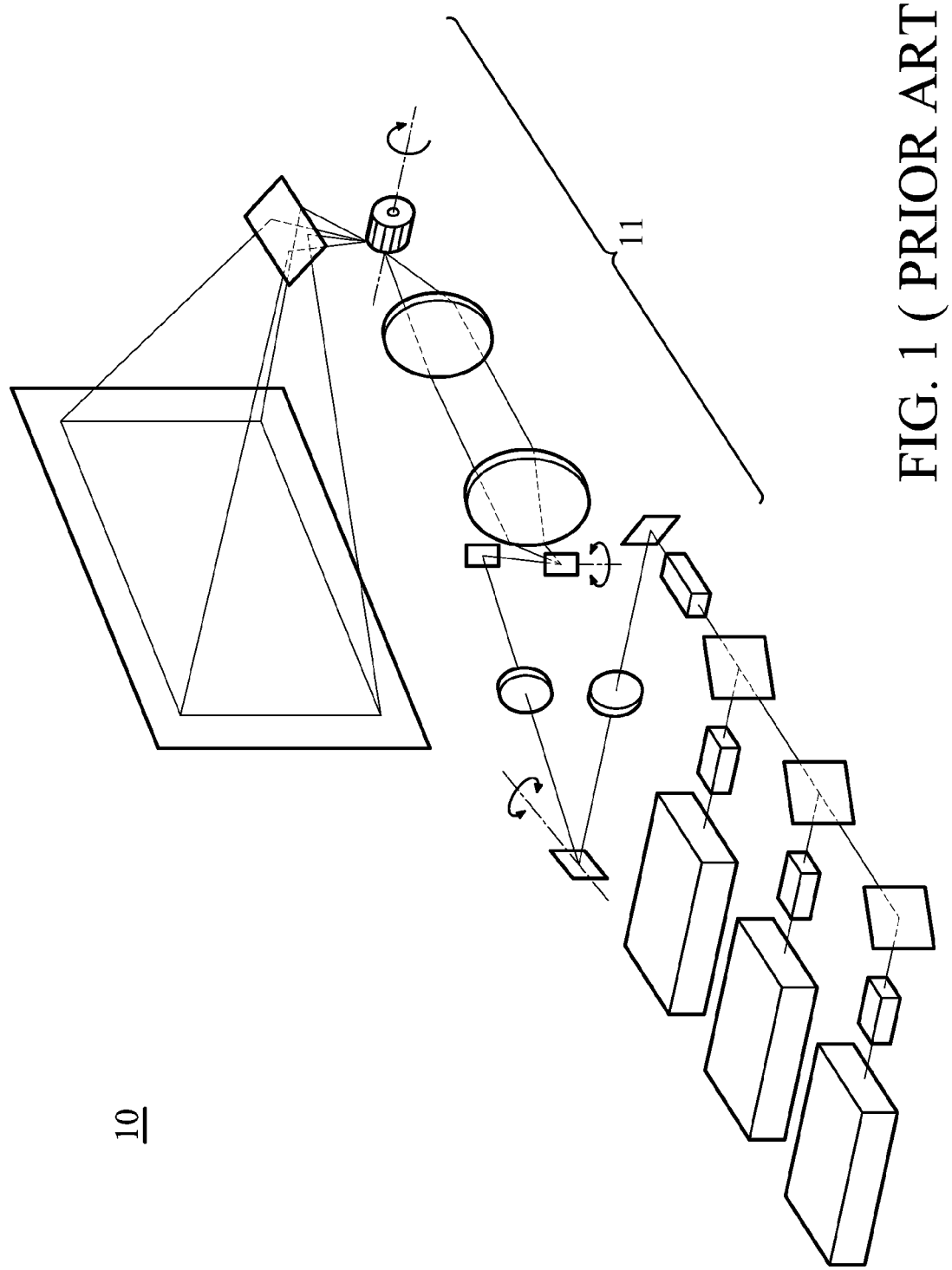
FIG. 1 is a schematic view of a conventional laser color display.
Figure 2:
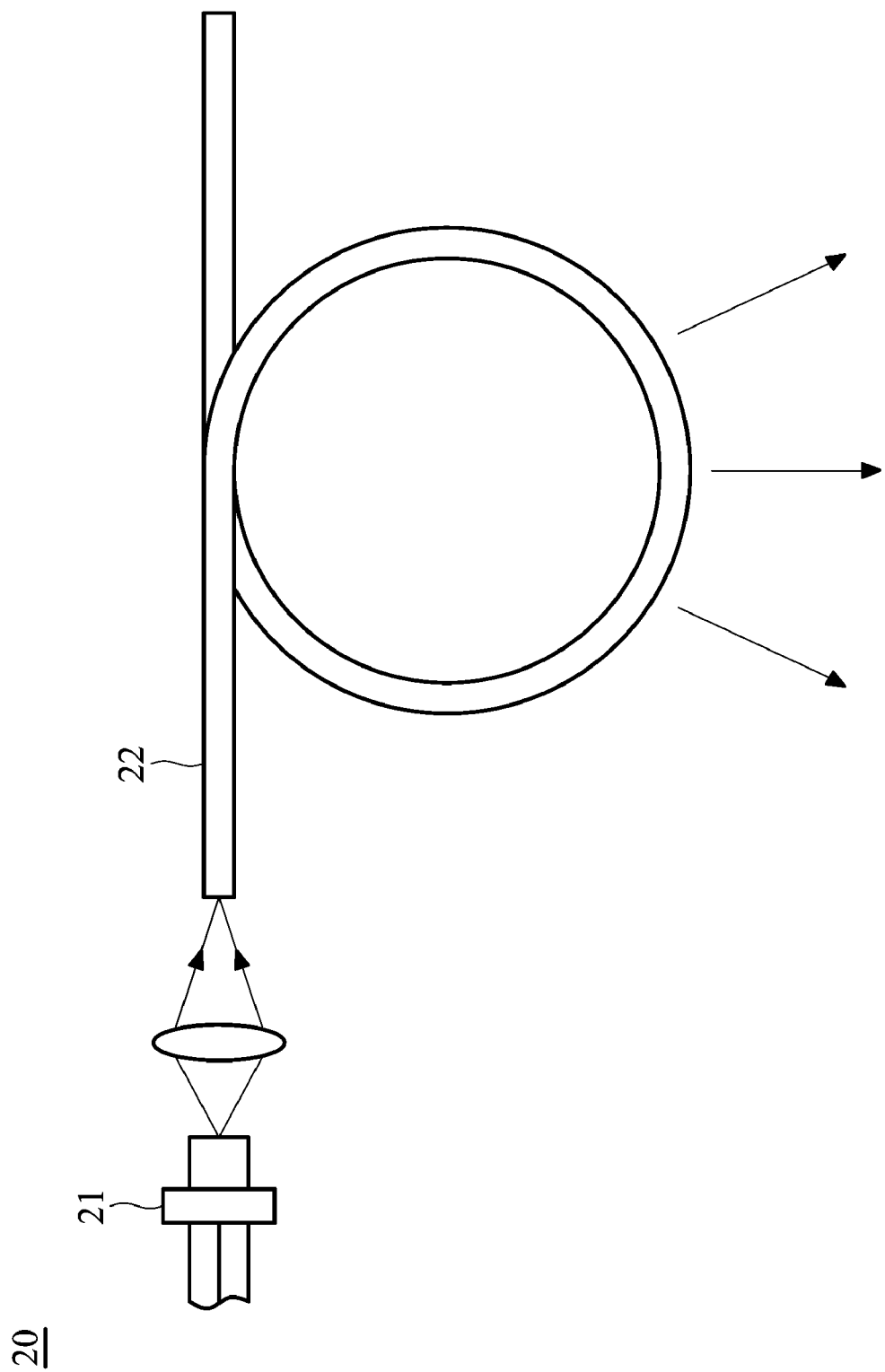
FIG. 2 is a schematic view of another conventional laser color display.
Figure 3:
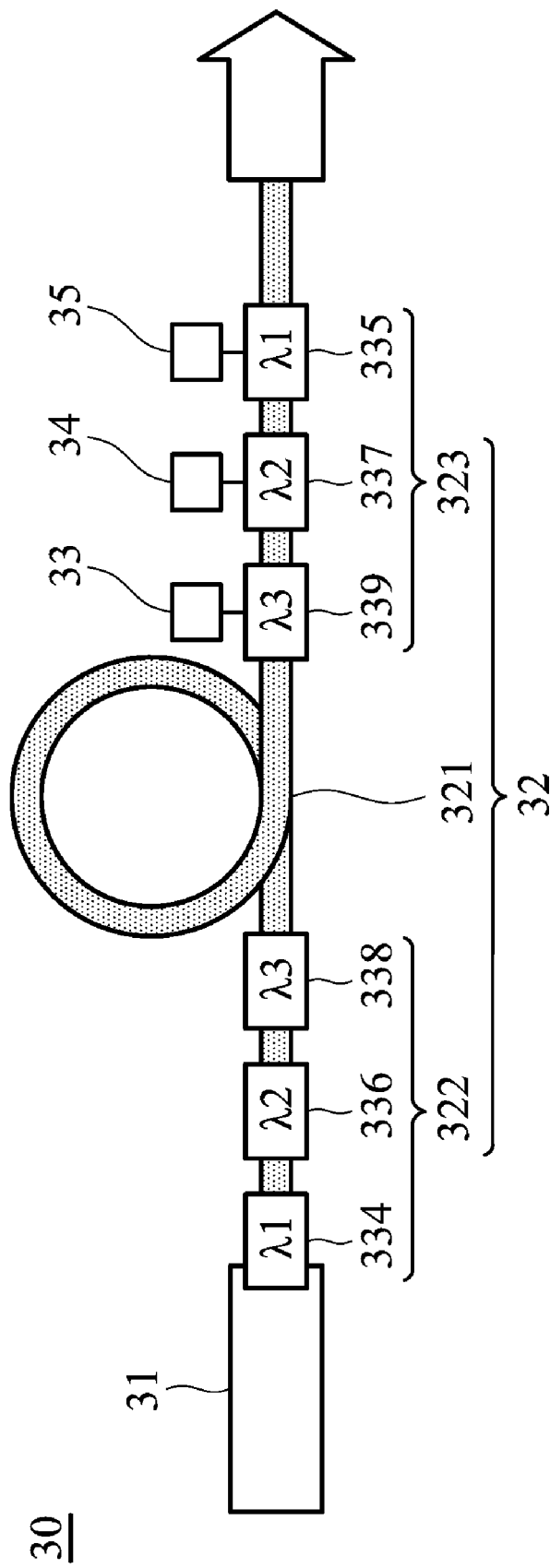
FIG. 3 is a schematic view of an all-fiber color laser of the invention.
Figure 4:
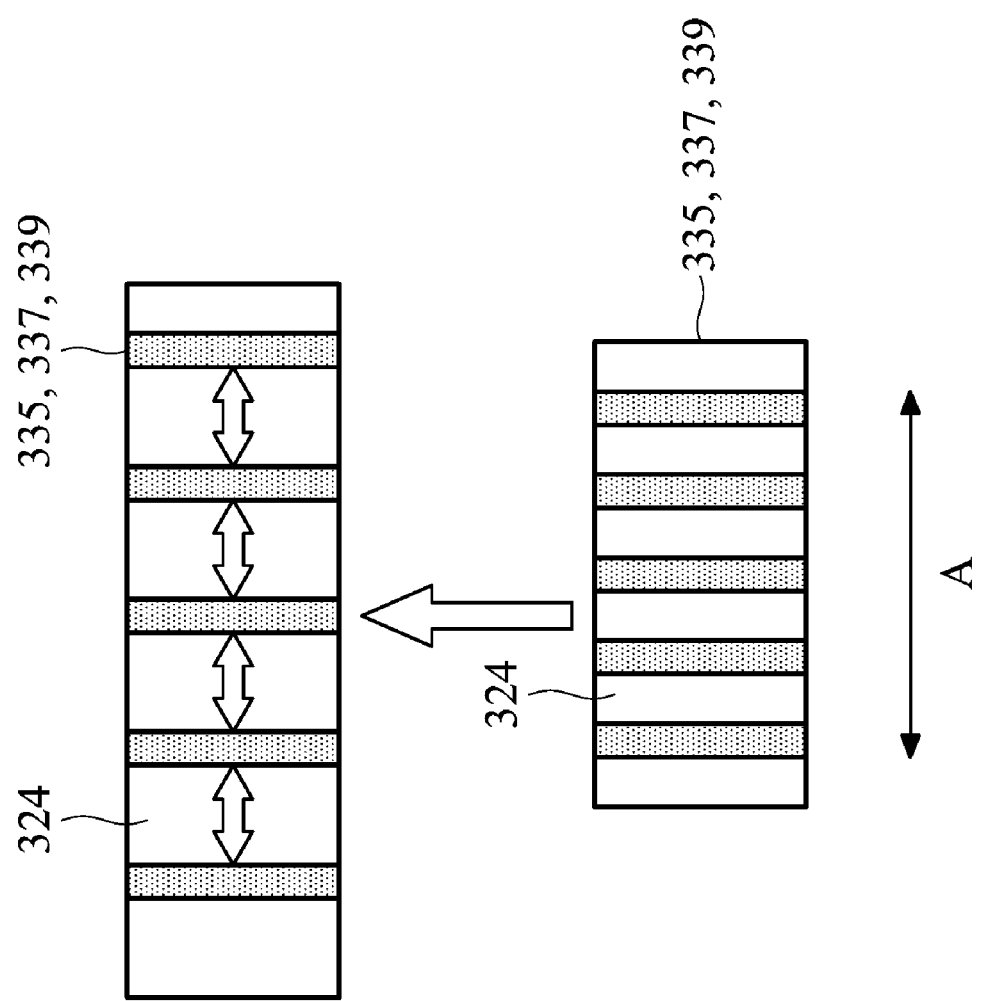
FIG. 4 is a schematic view showing a lengthwise deformed second grating assembly.

FIG. 3 is a schematic view of an all-fiber color laser of the invention. FIG. 4 is a schematic view showing a lengthwise deformed second grating assembly.

Referring to FIGS. 3 and 4, an all-fiber color laser 30 includes a pump light source 31, an optic fiber 32 and a plurality of modulators 33, 34 and 35. The pump light source 31 radiates a laser beam. The optic fiber 32 connects to the pump light source 31 and includes a multi-level wavelength gain medium 321, a first grating assembly 322 and a second grating assembly 323.

The first grating assembly 322 includes a first grating 334, a second grating 336 and a third grating 338. The second grating assembly 323 includes a fourth grating 335, a fifth grating 337 and a sixth grating 339. The fourth grating 335 of the second grating assembly 323 is connected to the third modulator 35. The fifth grating 337 of the second grating assembly 323 is connected to the second modulator 34. The sixth grating 339 of the second grating assembly 323 is connected to the first modulator 33.

The lasers are stimulated via the multi-level wavelength gain medium 321 to generate the laser beams with various wavelengths λ1, λ2 and λ3. The deformation of the second grating assembly 323 is adjusted along a lengthwise direction of the optic fiber 32, as shown in FIG. 4. Because the second grating assembly 323 has a plurality of slits 324, the interval of the slits 324 are adjusted via the first modulator 33, the second modulator 34 and the third modulator 35 to control the output of the laser beams with various wavelengths λ1, λ2 and λ3 for mixing color.

The first grating assembly 322 and the second grating assembly 323 are fiber Bragg gratings (FBG). The multi-level wavelength gain medium 321 is a praseodymium (Pr). The pump light source 31 is a laser diode, and the wavelength of the laser radiated by the laser diode ranges from 780 to 880 for stimulating praseodymium ions of the multi-level wavelength gain medium 321.

In this embodiment, the wavelength of the laser radiated by the laser diode is 800 nm. The laser beams with various wavelengths include a first laser beam with a first wavelength λ1, a second laser beam with a second wavelength λ2 and a third laser beam with a third wavelength λ3. The threshold generating the first laser beam with the first wavelength λ1 is greater than the threshold generating the second laser beam with the second wavelength λ2, and the threshold generating the second laser beam with the second wavelength λ2 is greater than the threshold generating the third laser beam with the third wavelength λ3 (wavelength: λ1<λ2<λ3). The threshold of a shorter wavelength is greater than that of a longer wavelength.

The first modulator 33, the second modulator 34 and the third modulator 35 may be a piezoelectric material or a circular magnetic field. The reflecting rate of the first grating assembly 322 and the second grating assembly 323 ranges from 80% to 99.9%. The amount of the modulators corresponds to the amount of the grating of the second grating assembly 323, and is not limited to the disclosed embodiments.

Figure 5:
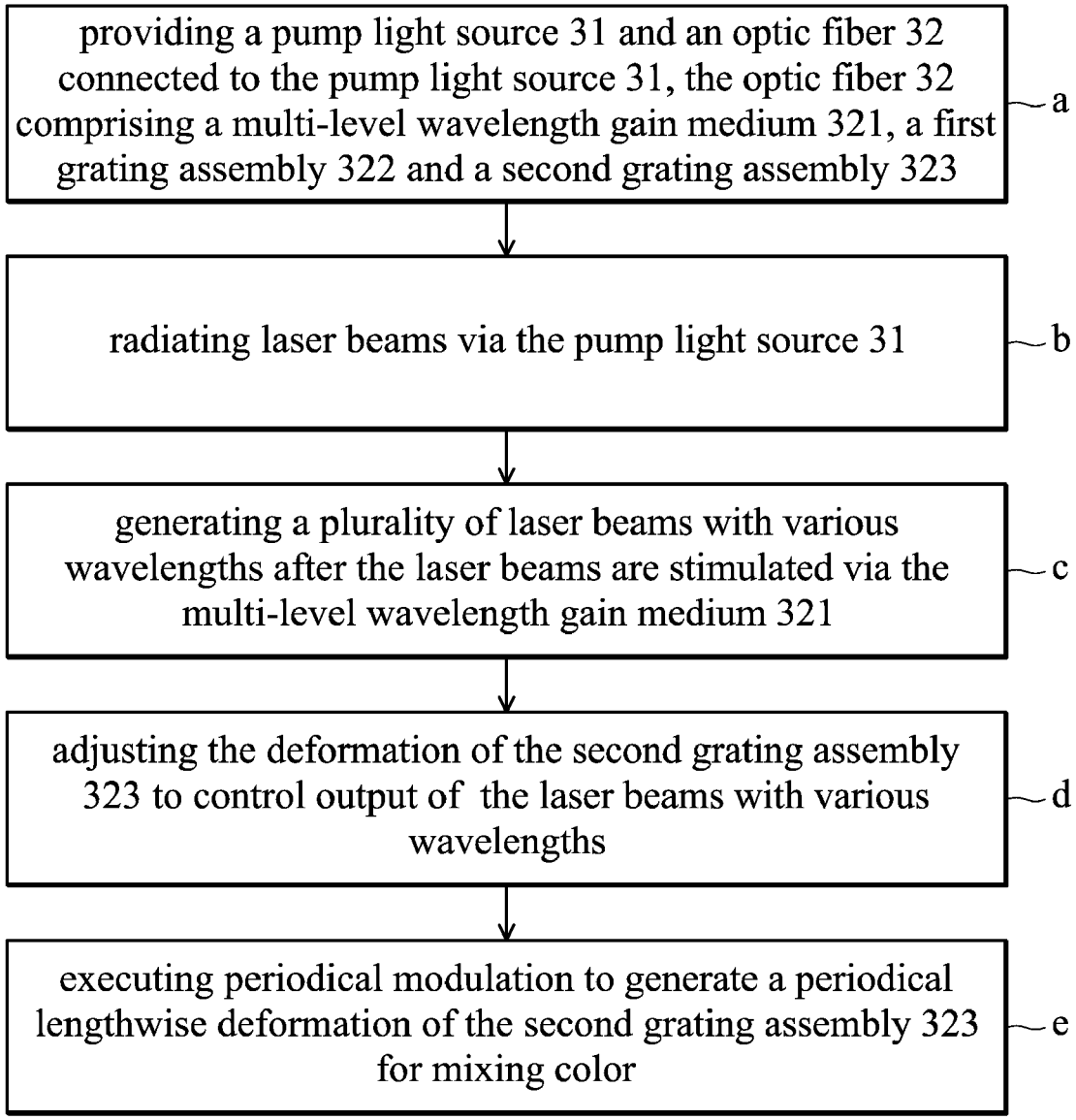
FIG. 5 is a flow chart of a light-illuminating method for an all-fiber color laser of the invention.

FIG. 5 is a flow chart of a light-illuminating method for an all-fiber color laser of the invention. Referring to FIGS. 3 to 5, the steps includes: a. providing a pump light source 31 and an optic fiber 32 connected to the pump light source 31, the optic fiber 32 including a multi-level wavelength gain medium 321, a first grating assembly 322 and a second grating assembly 323; b. radiating laser beams via the pump light source 31; c. generating a plurality of laser beams with various wavelengths after the laser beams are stimulated via the multi-level wavelength gain medium 321; d. adjusting the deformation of the second grating assembly 323 to control output of the laser beams with various wavelengths; and e. executing periodical modulation to generate a periodical lengthwise deformation of the second grating assembly 323 for mixing color.

If the all-fiber color laser 30 radiates the laser beam with the first wavelength λ1, the second grating assembly 323 is not lengthwise deformed. That is, the deformation of the second grating assembly 323 is zero. Because the first wavelength λ1 is a short wavelength (wavelength λ1<wavelength λ2<wavelength λ3) and the threshold generating the blue laser with the short wavelength is the highest, the laser beam with the first wavelength λ1 is outputted. In this embodiment, the laser beam with the first wavelength λ1 is a blue laser with the wavelength ranging from 460 to 495 nm. Thus, the all-fiber color laser 30 radiates the blue laser.

If the all-fiber color laser 30 radiates the laser beam with the second wavelength λ2, the sixth grating 339 of the second grating assembly 323 is lengthwise deformed via the first modulator 33 (shown in an arrow A of FIG. 4). Because the threshold generating the first laser beam with the first wavelength λ1 is greater than the threshold generating the second laser beam with the second wavelength λ2, and the threshold generating the second laser beam with the second wavelength λ2 is greater than the threshold generating the third laser beam with the third wavelength λ3, the laser beam with the second wavelength λ2 is outputted. In this embodiment, the laser beam with the second wavelength λ2 is a green laser with the wavelength ranging from 515 to 550 nm. Thus, the all-fiber color laser 30 radiates the green laser.

After the laser beams with various wavelengths enter the second grating assembly 323, if the all-fiber color laser 30 radiates the laser beam with the third wavelength λ3, the fifth grating 337 and the fourth grating 335 of the second grating assembly 323 are lengthwise deformed via the second and the third modulators 34 and 35 (shown in an arrow A of FIG. 4). At this time, the laser beam with the second wavelength λ2 and the laser beam with the first wavelength λ1 generate a laser resonant chamber. The laser resonant chamber is broken via modulation and the energy is lost. (The resonant chamber has no resonant function) In this embodiment, the laser beam with the third wavelength λ3 is a red laser with the wavelength ranging from 600 to 717 nm. Thus, the all-fiber color laser 30 radiates the red laser.

Thus, the second grating assembly 323 is periodically modulated for deformations, generating a red light, a blue light and a green light to provide color mixing of the all-fiber color laser 30.

The step of adjusting the deformation of the second grating assembly 323 includes exerting a force by a piezoelectric material or circular magnetic field, to make the second grating assembly 323 lengthwise deformed.

The invention uses a doped fiber capable of having a plurality of energy bands, and the gratings series connection system is designed as a resonant chamber. The inner intervals of the gratings of the gratings series connection system are suitably adjusted via different energy bands to selectively change the resonant chamber, thus, the required wavelength is provided for radiation of the all-fiber color laser. Therefore, the all-fiber color laser and the light-illuminating method thereof provide a multi-wavelength laser system with high coherence and high color saturation. An all-fiber structure provides good heat dissipation and simple mechanism. The all-fiber color laser of the invention improves illumination efficiency of the invention. Additionally, by using the same gain medium, differences in color decline degree of different light sources are prevented. Thus, the invention is suitable to be applied to measurement, communication or true color display devices and systems.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An all-fiber color laser, comprising:
   a pump light source, radiating laser beams;
   an optical fiber, connected to the pump light source, comprising:
      a multi-level wavelength gain medium;
      a first grating assembly comprising a first grating, a second grating and a third grating, wherein the first grating, the second grating and the third grating are sequentially connected; and
      a second grating assembly comprising a fourth grating, a fifth grating and a sixth grating, wherein the first grating assembly, the multi-level wavelength gain medium and the second grating assembly are adjacent; and
   a plurality of modulators, connecting to the second grating assembly, wherein the modulators comprise a first modulator, a second modulator and a third modulator, and the fourth grating, the fifth grating and the sixth grating are sequentially connected to the first modulator, the second modulator and the third modulator;
   wherein the laser beam stimulated via the gain medium generates a plurality of laser beams with various wavelengths, and the lengthwise deformation of the fourth grating, the fifth grating and the sixth grating is adjustable respectively via the modulators along the optic fiber to control the sequential output of red, green or blue light respectively.

2. The all-fiber color laser as claimed in claim 1, wherein the first grating assembly and the second grating assembly are fiber Bragg gratings (FBG) with various wavelengths.

3. The all-fiber color laser as claimed in claim 1, wherein the multi-level wavelength gain medium is a praseodymium (Pr) doped fiber.

4. The all-fiber color laser as claimed in claim 1, wherein the pump light source comprises a laser diode, and the wavelength of a laser beam from the laser diode ranges from 780 to 880 nm to stimulate the praseodymium (Pr) of the multi-level wavelength gain medium.

5. The all-fiber color laser as claimed in claim 1, wherein the laser beams with various wavelengths comprise a first laser beam with a first wavelength λ1, a second laser beam with a second wavelength λ2, and a third laser beam with a third wavelength λ3, and the threshold generating the first laser beam with the first wavelength λ1 is greater than the threshold generating the second laser beam with the second wavelength λ2, and the threshold generating the second laser beam with the second wavelength λ2 is greater than the threshold generating the third laser beam with the third wavelength λ3 (wavelength: λ1<λ2<λ3).

6. The all-fiber color laser as claimed in claim 5, wherein the laser beam with the first wavelength λ1 ranges from 460 to 495 nm and is blue.

7. The all-fiber color laser as claimed in claim 5, wherein the laser beam with the second wavelength λ2 ranges from 515 to 550 nm and is green.

8. The all-fiber color laser as claimed in claim 5, wherein the laser beam with the third wavelength λ3 ranges from 600 to 717 nm and is red.

9. The all-fiber color laser as claimed in claim 1, wherein the modulators comprise a piezoelectric material or a circular magnetic field.

10. The all-fiber color laser as claimed in claim 1, wherein the reflecting rate of the first grating assembly and the second grating assembly ranges from 80% to 99.9%.

11. The all-fiber color laser as claimed in claim 1, wherein the first grating assembly comprises a plurality of slits, the second grating assembly comprises a plurality of slits, and the interval of the slits of the second grating assembly is adjusted via the first modulator, the second modulator and the third modulator.

12. A light-illuminating method for an all-fiber color laser, comprising:
   providing a pump light source and an optic fiber connected to the pump light source,
   wherein the optic fiber comprises a multi-level wavelength gain medium, a first grating assembly and a second grating assembly;
   radiating laser beams via the pump light source;
   generating a plurality of laser beams with various wavelengths after the laser beams are stimulated via the multi-level wavelength gain medium;
   selectively outputting the laser beam with a first wavelength λ1 without the lengthwise deformation of the grating assemblies, making a sixth grating of the second grating assembly to lengthwise deform to output the laser beam with a second wavelength λ2, or making a fourth grating and a fifth grating of the second grating assembly to lengthwise deform to output the laser beam with a third wavelength λ3; and executing periodical modulation to make the second grating assembly to periodically adjust the deformation of the second grating assembly for mixing colors;

wherein the lengthwise deformation of the fourth grating, the fifth grating and the sixth grating is adjustable respectively via the modulators along the optic fiber to control the sequential output of red, green or blue light respectively.

13. The light-illuminating method for the all-fiber color laser as claimed in claim 12, wherein the step of adjusting the deformation of the second grating assembly comprises exerting a force by a piezoelectric material or circular magnetic field to stretch the second grating assembly to generate a lengthwise deformation.

14. The light-illuminating method for the all-fiber color laser as claimed in claim 12, wherein the step of adjusting the deformation of the second grating assembly comprises setting the deformation of the second grating assembly to zero.

15. The light-illuminating method for the all-fiber color laser as claimed in claim 12, wherein the first grating assembly and the second grating assembly are fiber Bragg gratings (FBG) with various wavelengths.

16. The light-illuminating method for the all-fiber color laser as claimed in claim 12, wherein the multi-level wavelength gain medium is a praseodymium (Pr) doped fiber.

17. The light-illuminating method for the all-fiber color laser as claimed in claim 12, wherein the laser beams with various wavelengths comprise a first laser beam with the first wavelength $\lambda 1$, a second laser beam with the second wavelength $\lambda 2$, and a third laser beam with the third wavelength $\lambda 3$, and the threshold generating the first laser beam with the first wavelength $\lambda 1$ is greater than the threshold generating the second laser beam with the second wavelength $\lambda 2$, and the threshold generating the second laser beam with the second wavelength $\lambda 2$ is greater than the threshold generating the third laser beam with the third wavelength $\lambda 3$ (wavelength: $\lambda 1 < \lambda 2 < \lambda 3$).

18. The light-illuminating method for the all-fiber color laser as claimed in claim 17, wherein the laser beam with the first wavelength $\lambda 1$ ranges from 460 to 495 nm and is blue.

19. The light-illuminating method for the all-fiber color laser as claimed in claim 17, wherein the laser beam with the second wavelength $\lambda 2$ ranges from 515 to 550 nm and is green.

20. The light-illuminating method for the all-fiber color laser as claimed in claim 17, wherein the laser beam with the third wavelength $\lambda 3$ ranges from 600 to 717 nm and is red.

21. The light-illuminating method for the all-fiber color laser as claimed in claim 12, wherein the reflecting rate of the first grating assembly and the second grating assembly ranges from 80% to 99.9%.

22. The light-illuminating method for the all-fiber color laser as claimed in claim 12, wherein the first grating assembly comprises a plurality of slits, the second grating assembly comprises a plurality of slits, the a plurality of modulators comprise a first modulator, a second modulator and a third modulator, and the interval of the slits of the second grating assembly is adjusted via the first modulator, the second modulator and the third modulator.

23. The light-illuminating method for the all-fiber color laser as claimed in claim 12, wherein the first grating assembly comprises a first grating, a second grating and a third grating, the first grating, the second grating and the third grating are sequentially connected, a plurality of modulators comprise a first modulator, a second modulator and a third modulator, and the fourth grating, the fifth grating and the sixth grating are sequentially connected to the first modulator, the second modulator and the third modulator.

* * * * *